United States Patent Office 3,239,469
Patented Mar. 8, 1966

3,239,469
POLYMER CURING SYSTEM
Charles C. Bice, Bartlesville, Okla., assignor to Phillips Petroleum Company, a corporation of Delaware
No Drawing. Original application Oct. 26, 1959, Ser. No. 848,863, now Patent No. 3,154,527, dated Oct. 27, 1964. Divided and this application Apr. 18, 1963, Ser. No. 274,056
10 Claims. (Cl. 252—182)

This application is a division of my copending application Serial No. 848,863, filed October 26, 1959, now Patent 3,154,527, issued October 27, 1964.

This invention relates to a polymer curing system. In one aspect this invention relates to curing vinylpyridine copolymers to vinylpyridine rubbers.

In recent years, great interest has developed in solid propellants for pet propulsion devices such as missiles, rocket motors, gas generators, and the like. One type of solid propellant which has received considerable attention is that of the composite type, a typical composite propellant being one that uses an organic material as the fuel and binder, and a solid oxidant such as ammonium nitrate. In this type of propellant, particularly when the propellant comprises a major proportion of a crystalline oxidizer component and a minor proportion of a fuel or binder component, the problem is presented of adjusting the physical properties of the propellant because of the small proportion of the binder material. Thus, it is difficult to provide suitable adhesion to the particles of oxidizer and the matrix of binder material is so tenuous that it is difficult to provide sufficient strength and elasticity in the propellant structure. Also, in many cases, it is desirable and necessary to be able to cast or pour the propellant into a rocket case or mold and then cure to a solid having suitable properties. In addition, since the binder component also forms a fuel, or part of the fuel, it must have suitable chemical properties for this purpose.

A considerable amount of work has been done using copolymers of conjugated dienes with copolymerizable heterocyclic nitrogen bases as the principal ingredient of the binder component for the solid oxidant in composite type propellants. Copolymers of 1,3-butadiene and 2-methyl-5-vinylpyridine are examples of such copolymers. Most of the work in the past has involved the use of solid copolymers in extrudable or compression molded propellants. More recently it has become desirable to prepare cast propellants and interest in the use of liquid copolymers of conjugated dienes with said heterocyclic nitrogen bases has increased. Said liquid copolymers provide a liquid binder component into which the oxidizer component and other ingredients can be mixed and the resulting composition cast into a suitable mold and then cured. Some difficulty has been encountered in using said liquid copolymers in that suitable cures have been difficult to obtain.

I have found that when a liquid copolymer of a conjugated diene with a vinylpyridine is cured with the new curing agents of the invention, said new curing agent consisting essentially of a halocarboxylic acid together with a triaziridinyl phosphine oxide or sulfide (as defined further hereinafter), there is provided a cured rubber which is particularly well suited for use in the binder component of composite type propellants. I have found that composite type propellants wherein the binder component comprises such a rubber possess exceptional physical properties.

The propellants produced with the cure system of this invention are quite valuable because of said superior physical properties such as elongation and tensile strength. One valuable feature of the invention is that propellants having high tensile strengths at temperatures as high as 170° F. can be prepared. Said high temperature properties make the propellants very suitable for use in high temperature regions such as storage under desert conditions. Another valuable feature is that propellants which do not freeze at temperatures as low as minus 70° F. Said low temperature properties make the propellants very suitable for Arctic and high altitude use.

Thus, in its broadest aspects, the present invention resides in (a) a new curing system consisting essentially of a halocarboxylic acid and a triaziridinyl phosphine oxide or sulfide (both of said ingredients being defined further hereinafter), (b) a vinylpyridine rubber prepared by curing a liquid copolymer of a conjugated diene with a vinylpyridine with said new curing system, and (c) composite type propellants wherein the binder component comprises said vinylpyridine rubber. In other aspects the invention resides in methods for curing said copolymer, methods for preparing said propellant composition, and a method for developing thrust using the propellant composition of the invention.

An object of this invention is to provide a new curing system for liquid copolymers of vinylpyridines. Another object of this invention is to provide an improved vinylpyridine rubber. Still another object of this invention is to provide an improved vinylpyridine rubber prepared by curing a vinylpyridine liquid copolymer with said new curing system. Another object of this invention is to provide an improved method of curing liquid copolymers of a vinylpyridine with a conjugated diene. Another object of this invention is to provide a composite type propellant having improved physical properties. Another object of this invention is to provide a method of preparing said improved propellant composition. Still another object of this invention is to provide a method of developing thrust by burning said improved propellant composition. Other aspects, objects and advantages of the invention will be apparent to those skilled in the art in view of this disclosure.

The vinylpyridine polymeric materials used in the practice of the invention are liquid copolymers of one or more conjugated dienes with one or more vinylpyridine compounds. The polymerizable vinylpyridine compounds or heterocyclic nitrogen bases which are applicable for the production of the polymeric materials are those of the pyridine series which are copolymerizable with a conjugated diene and contain one, and only one,

substituent wherein $R_1$ is either hydrogen or a methyl group. That is, the substituent is either a vinyl or an alpha-methylvinyl (isopropenyl) group. Various substituted derivatives are also applicable but the total number of carbon atoms in the groups attached to the carbon atoms of the heterocyclic nucleus should not be greater than 15 because the polymerization rate decreases somewhat with increasing size of the alkyl group. Compounds where the alkyl substituents are methyl and/or ethyl are available commercially.

These vinylpyridine compounds or heterocyclic nitrogen bases have the formula

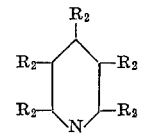

where each $R_2$ is selected from the group consisting of hydrogen, alkyl, vinyl, and alpha-methylvinyl groups; one and only one of said groups being selected from the group consisting of vinyl and alpha-methylvinyl; and the total number of carbon atoms in the nuclear substituted groups being not greater than 15. Examples of such compounds are:

2-vinylpyridine;
2-vinyl-5-ethylpyridine;
2-methyl-5-vinylpyridine;
4-vinylpyridine;
2,3,4-trimethyl-5-vinylpyridine;
3,4,5,6-tetramethyl-2-vinylpyridine;
3-ethyl-5-vinylpyridine;
2,6-diethyl-4-vinylpyridine;
2-isopropyl-4-nonyl-5-vinylpyridine;
2-methyl-5-undecyl-3-vinylpyridine;
2,4-dimethyl-5,6-dipentyl-3-vinylpyridine;
2-decyl-5-(alpha-methylvinyl) pyridine;
2-vinyl-3-methyl-5-ethylpyridine;
2-methoxy-4-chloro-6-vinylpyridine;
3-vinyl-5-ethoxypyridine;
2-vinyl-4,5-dichloropyridine;
2-(alpha-methylvinyl)-4-hydroxy-6-cyanopyridine;
2-vinyl-4-phenoxy-5-methylpyridine;
2-cyano-5-(alpha-methylvinyl) pyridine;
3-vinyl-5-phenylpyridine;
2-(para-methylphenyl)-3-vinyl-4-methylpyridine;
3-vinyl-5-(hydroxyphenyl)-pyridine;
2-methyl-4-nonyl-6-vinylpyridine; and the like.

The conjugated dienes employed are those containing from 4 to 10 carbon atoms per molecule and include 1,3-butadiene, isoprene, 2-methyl-1,3-butadiene, and the like. Various alkoxy, such as methoxy and ethoxy and cyano derivatives of these conjugated dienes, are also applicable. Thus, other dienes, such as phenylbutadiene, 2,3-dimethyl-1,3-hexadiene, 2-methoxy-3-ethylbutadiene, 2-ethoxy-3-ethyl-1,3-hexadiene, 2-cyano-1,3-butadiene, are also applicable. Instead of using a single conjugated diene, a mixture of conjugated dienes can be employed. Thus, a mixture of 1,3-butadiene and isoprene can be employed as the conjugated diene portion of the monomer system.

The vinylpyridine polymeric materials used in the practice of the invention can be prepared by any of the polymerization methods known to the art, e.g., mass or emulsion polymerization. One convenient method for preparing these copolymers is by emulsion polymerization at temperatures in the range between 0 and 140° F. Recipes such as the iron pyrophosphate-hydroperoxide, either sugar free or containing sugar, disulfoxylate and the persulfate recipes are among those which are applicable.

As liquid polymers I include those having a viscosity of at least 40 poises at 77° F. and a maximum viscosity of about 2,000 poises at 77° F. When the polymer is to be used as the binder component of a composite type propellant, it is preferred that the viscosity of said polymer be within the range of 200 to 900 poises at 77° F. in order to obtain more satisfactory castings.

The halocarboxylic acids which can be used in the practice of the invention can be presented by the structural formula

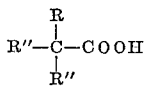

wherein each R″ is selected from the group consisting of chlorine, bromine, iodine, hydrogen and alkyl groups containing from 1 to 4 carbon atoms. At least one R″, and only one, must be a halogen atom.

Examples of said halocarboxylic acids which are useful in the practice of the invention include, among others, the following: monochloroacetic acid, monobromoacetic acid, monoiodoacetic acid, monochloropropanoic acid, bromopropanoic acid, monochlorobutanoic acid, monobromobutanoic acid, monoiodoisobutanoic acid, monochlorovaleric acid, monochloroisovaleric acid, monobromoisovaleric acid, methyl monochloroacetic acid, ethyl monobromoacetic acid, butyl monochloroacetic acid, dimethyl monochloroacetic acid, diethyl monochloroacetic acid, and the like.

The other component of the curing system of the invention is a triaziridinyl phosphine oxide or sulfide selected from the group of said oxides and sulfides which can be represented by the formula

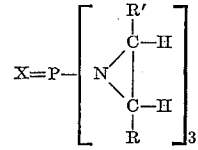

wherein: X is selected from the group consisting of oxygen and sulphur; each R′ is selected from the group consisting of a hydrogen atom and a methyl radical; and each R is selected from the group consisting of a hydrogen atom and alkyl radicals containing from 1 to 18 carbon atoms.

Examples of said phosphine compounds which can be employed in the practice of the invention include, among others, the following:

tri(1-aziridinyl)phosphine oxide,
tri(2-methyl-1-aziridinyl)phosphine oxide,
tri(2,3-dimethyl-1-aziridinyl)phosphine oxide,
tri(2-isopropyl-1-aziridinyl)phosphine oxide,
tri(2-methyl-3-ethyl-1-aziridinyl)phosphine oxide,
tri(2-isopropyl-1-aziridinyl)phosphine oxide,
tri(2-methyl-3-n-butyl-1-aziridinyl)phosphine oxide,
tri(2-hexyl-1-aziridinyl)phosphine oxide,
tri(2-methyl-3-octyl-1-aziridinyl)phosphine oxide,
tri(2-methyl-3-decyl-1-aziridinyl)phosphine oxide,
tri(2-dodecyl-1-aziridinyl)phosphine oxide,
tri(2-methyl-3-tridecyl-1-aziridinyl)phosphine oxide,
tri(2-methyl-3-octadecyl-1-aziridinyl)phosphine oxide,
tri(1-aziridinyl)phosphine sulfide,
tri(2-methyl-1-aziridinyl)phosphine sulfide,
tri(2,3-dimethyl-1-aziridinyl)phosphine sulfide,
tri(2-methyl-3-isopropyl-1-aziridinyl)phosphine sulfide,
tri(2-tert-butyl-1-aziridinyl)phosphine sulfide, and
tri(2-methyl-3-pentadecyl-1-aziridinyl)phosphine sulfide.

In general the polymeric material used in the practice of the invention will consist of chains with random distribution of butadiene units and substituted pyridine units. While I do not wish to be bound by any theory of the mechanism of the cure, it is presently believed that the halocarboxylic acid of the curing system quaternizes the pyridine nitrogen atoms in the copolymer and thus provides said polymer with carboxy groups. One, two or three of the amide groups in the phosphine compound then react with the active carboxyl groups of the polymer to cross link said polymer chains and form a polymeric network. It is believed evident that when there are two or more pyridine nuclei in the polymer molecule, the curing system of the invention will cause cross linking resulting in polymer networks to give firm rubbery products. Furthermore, the tri-functionality of the curing system will tie mono-functional polymer molecules or chains (containing only one pyridine nucleus) into the polymer network.

The amount of curing system used in the practice of the invention will depend upon the functionality of the polymers (based upon the number of pyridine nuclei in the polymer molecule), and the molecular weight of said polymer. In general, the amount of curative used is 100 percent of stoichiometric when using polymers in the low range (about two) of polymer functionality, and in the range from 30 percent to 150 percent of stoichometric when using 100 percent difunctional polymers, i.e., polymers containing two pyridine nuclei per molecule. When using polymers having an average of more than two pyridine nuclei per molecule or chain, the amount of curative can be as low as 50 percent of stoichiometric. An excess of carboxyl groups in the curative system increases adherence when the polymer is used in the binder component of composite type propellants. To provide excess carboxyl groups, less than an equivalent amount of the phosphine compound is used with the halocarboxylic acid.

Thus, in general practice, the curing agents of the curing system of the invention are used in amounts within the following ranges: from $$\frac{0.47\left(2+\frac{M.W.}{50,000}\right)}{f} \text{ to } \frac{3f-3}{f+\frac{M.W.}{50,000}}$$

mols of halocarboxylic acid per mol of nuclear nitrogen in the vinylpyridine copolymer, where $f$ is the number of mols of nuclear nitrogen per molecule of said copolymer and is within the range of 1.8 to 10.0, and M.W. is the molecular weight of said copolymer and is within the range of 2,000 to 10,000; and from about 0.3 to about 0.4 mol of said phosphine compound per mol of said acid.

In the practice of the invention, the halocarboxylic acid and the phosphine compound of the curing system may be added to the copolymer either separately (in any order) or may be reacted together prior to their addition to the coplymer and then added to said copolymer. For castable propellant systems it is preferred to react said curative agents together prior to adding same to the copolymer to be cured. It has been found that the reaction of the halocarboxylic acid with the phosphine compound is more rapid than the reaction of said halocarboxylic acid with the pyridine compounds.

It is not necessary to react the curative agents together immediately prior to use. If desired, said curative agents can be reacted together at any time prior to use and stored until needed. Thus the reacted mixture of the above defined halocarboxylic acid and the above defined phosphine compound form a curing system or curing agent, suitable for curing the above defined liquid copolymers, which curing system or curing agent can be prepared in advance and stored until needed. When said curing system or curing agent is thus prepared in advance, a convenient ratio of the curing agents therein has been found to be about 0.3 to about 0.4 mol of said phosphine compound per mol of said carboxylic acid. A curing system containing said curing agents in said ratio will be satisfactory for the big majority of the above defined liquid copolymers. For more precise cures however, it is preferred to determine the amount of carboxylic acid in accordance with the properties of the specific polymer as set forth above.

While the preferred polymeric vinylpyridine materials used in the practice of the invention are copolymers of said conjugated dienes with said vinylpyridine, it is also within the scope of the invention to include a third type of polymerizable monomer. For example, styrene or an alkoxy derivative thereof, such as methoxy styrene, ethoxy styrene, propoxy styrene, and butoxy styrene; alkyl substituted styrenes, such as methyl styrene, ethyl styrene, propyl styrene, and butyl styrene; acrylonitrile; methacrylonitrile; acrylates, for example, methyl acrylate, ethyl acrylate, propyl acrylate, and butyl acrylate; and methacrylates such as methyl methacrylate and the like.

In the preparation of the vinylpyridine polymeric materials of the invention, the proportion of the various monomers can vary over a wide range. For example, the conjugated diene can vary from 50 to about 95 parts by weight, the vinylpyridine compound can vary from 50 to about 5 parts by weight, and the third polymerizable monomer can vary from 0 to about 48 parts by weight, all based on 100 parts by weight of total monomers.

The binder component contains rubbery polymers of the type hereinbefore described and, in addition, there can be present one or more reinforcing agents, plasticizers, wetting agents, and antioxidants. The finished binder frequently will contain various compounding ingredients. Thus, it will be understood that herein and in the claims, unless otherwise specified, the term "binder" is employed generically and includes various conventional compounding ingredients. The binder content of the propellant composition will usually range from 5 to 40 percent by weight.

A general formulation for the binder component of the propellant compositions of the invention is as follows:

| | Parts by weight |
|---|---|
| Copolymer | 100. |
| Reinforcing agent | 0–50. |
| Plasticizer | 0–100. |
| Wetting agent | 0–10. |
| Antioxidant | 0–3. |
| Curative | As defined above. |

Reinforcing agents which can be employed include carbon black, wood flour, lignin, and various reinforcing resins such as styrene-divinylbenzene, methyl acrylate-divinylbenzene, acrylic acid-styrene-divinylbenzene, and methyl acrylate-acrylic acid-divinylbenzene resins.

In general, any rubber plasticizer can be employed in the binder compositions. Materials such as Pentaryl A (amylbiphenyl), Paraflux (saturated polymerized hydrocarbon), Circosol-2XH (petroleum hydrocarbon softener having a specific gravity of 0.940 and a Saybolt Universal viscosity at 100° F. of about 2000 seconds), di(1,4,7-trioxyaundecyl)methane, and diocyl phthalate are suitable plasticizers. Materials which provide a rubber having good low temperature properties are preferred. It is also frequently preferred that the plasticizers be oxygen-containing materials.

Wetting agents aid in deflocculating or dispersing the oxidizer. Aerosol OT (dioctyl ester of sodium sulfosuccinic acid), lecithin, and Duomeen C diacetate (the diacetate of trimethylenediamine substituted by a coconut oil product) are among the materials which are applicable.

Antioxidants which can be empoyed include Flexamine (physical mixture containing 65 percent of a complex diarylamine-ketone reaction product and 35 percent of N,N'-diphenyl-p-phenylenediamine), phenyl - beta - naphthylamine, 2,2 - methylene - bis(4 - methyl - 6 - tertbutylphenol), and the like. Rubber antioxidants, in general, can be employed or if desired can be omitted.

It is to be understood that each of the various types of compounding ingredients can be used singly or mixtures of various ingredients performing a certain function can be employed. It is sometimes preferred, for example, to use mixtures of plasticizers rather than a single material.

Oxidizers which are applicable in the solid propellant compositions of the invention include ammonium nitrate, the alkali metal nitrates, ammonium perchlorate, and the alkali metal perchlorates. As used herein, the term "alkali metal" includes sodium, potassium, lithium, cesium, and rubidium. Ammonium nitrate and ammonium perchlorate are the presently preferred oxidizers. Mixtures of said oxidizers are also applicable. In the preparation of the solid rocket propellant compositions of the invention, said oxidizers are gorund to a particle size preferably within the range between 20 and 200 microns average particle size. The most preferred particle size is from about 40 to about 60 microns. The amount of oxidizer used is a major amount of the total composition and is usually within the range of about 60 to about 95 weight percent of the propellant composition. It is frequently preferred to use a phase stabilized ammonium nitrate. One method of phase stabilizing ammonium nitrate comprises mixing about 10 parts by weight of a potassium salt (usually potassium nitrate) with about 90 parts by weight of ammonium nitrate along with some water, heating the mixture to about 140° F., drying, and then grinding the resulting mixture to the desired particle size.

Where it is desired to closely control the burning rate of the propellant composition suitable burning rate catalysts can be incorporated therein. These catalysts include materials such as ferrocyanides sold under various trade names, such as Prussian blue, Steel blue, Bronze blue, Turnbull's blue, Chinese blue, New blue, Antwerp blue, Mineral blue, Paris blue, Berlin blue, Hamburg blue, Williamson blue, and the like. Other useful burning rate catalysts include copper chromite, ammonium dichromate, potassium dichromate, sodium dichromate and the like.

The various ingredients in the propellant compositions of the invention can be mixed in any suitable manner using any suitable type of mixing equipment. For example, a Baker-Perkins dispersion blade mixer or a Read Company standard sigma blade mixer can be used. In the final propellant composition the binder component forms a continuous phase with the oxidizer component being discontinuous phase. The various ingredients of the propellant composition can all be mixed together in one step if desired. However, in a presently preferred mixing procedure the phosphine compound and the halocarboxylic acid of the curing system are reacted together first by adding said phosphine compound to said acid slowly and controlling the temperature below about 180° F. to form a first blend. The liquid copolymer and the solid oxidizer component, together with any other solid ingredients which may be used such as a burning rate catalyst for example, are then mixed under vacuum at a temperature of about 160° F., or any other suitable temperature, in a suitable type mixer. Said first blend forming the curing system of the invention is then added to said second blend of copolymer and oxidizer component and mixing is carried out in said mixer for an additional period of time sufficient to form a uniform dispersion. If a plasticizer is used in the propellant composition it is usually incorporated into the mixture along with the curing system. In said mixing steps it will be understood that the mixing can be carried out at any suitable temperature and for any suitable period of time sufficient to obtain uniform mixing.

After the propellant composition has been formulated as indicated above, or by any other suitable mixing technique, rocket grains can be formed by casting the propellant mixture into a suitable mold. After forming, the rocket grains are cured. The curing temperature will generally be in the range between about 70 to 250° F., preferably between 150 and 250° F. The curing time must be long enough to give the required creep resistance and other mechanical properties in the propellant. The curing time will generally range from around two hours, when the higher curing temperatures are employed, to about seven days when curing is effected at the lower temperatures.

The following examples will serve to further illustrate the invention:

EXAMPLE I

An amount of a liquid coploymer of 1,3-butadiene with 2-methyl-5-vinylpyridine, prepared as described hereinafter in Example IV, and having a viscosity of about 400 to about 600 poises at 77° F., was mixed with a stoichiometric amount of monochloroacetic acid and the mixture heated for one week at 160° F. At the end of said week the viscosity of the mixture had increased to about 3,000 poises, just flowable under gravity. This example shows that while the halocarboxylic acid will effect some cure of the liquid copolymer of the conjugated diene with a vinylpyridine, the amount of cure effected is not sufficient to produce a solid rubbery material.

EXAMPLE II

Another sample of the liquid copolymer of 1,3-butadiene with 2-methyl-5-vinylpyridine used in Example I was mixed with a stoichiometric amount of tri(2-methyl-1-aziridinyl)-phosphine oxide, and the mixture was heated for one week at 160° F. At the end of said week it was found there had been no increase in viscosity of the polymer. This example shows that the phosphine compounds of the curing system of the invention, when used alone, will not effect a cure of said liquid copolymers.

EXAMPLE III

One mol of monochloracetic acid was mixed with approximately 0.33 mols of tri(2-methyl-1-aziridinyl)-phosphine oxide by adding said acid to said phosphine compound slowly and maintaining the temperature of the mixture below 180° F. Said mixture of acid and phosphine compound was then mixed with another sample of the liquid copolymer of 1,3-butadiene with 2-methyl-5-vinylpyridine used in Examples I and II, and the resulting mixture was heated for 48 hours at 160° F. At the end of this curing time it was found that the liquid copolymer had cured to a good firm rubber having a Mooney value of approximately 70 (ML–4 at 212° F.).

EXAMPLE IV

A liquid copolymer was prepared by emulsion polymerization of 1,3-butadiene and 2-methyl-5-vinylpyridine at 41° F. The polymerization recipe was as follows:

|  | Parts by weight |
| --- | --- |
| Water | 200 |
| 1,3-butadiene | 85 |
| 2-methyl-5-vinylpyridine | 15 |
| Potassium fatty acid soap | 5.0 |
| Potassium hydroxide | 0.05 |
| Potassium chloride | 0.20 |
| Daxad 11[1] | 0.20 |
| Sequestrene AA[2] | 0.03 |
| Sodium formaldehyde sulfoxylate dihydrate | 0.05 |
| Ferrous sulfate heptahydrate | 0.02 |
| Para-menthane hydroperoxide | 0.06 |
| Sulfate mercaptan | 7.5 |
| Shortstop: di-t-butylhydroquinone | 0.20 |

[1] Sodium salt of condensed alkyl aryl sulfonic acid.
[2] Ethylenediamine tetraacetic acid.

The reaction time was approximately 7.6 hours to a 60 percent conversion. The polymers were coagulated by adding 0.5 weight percent sulfuric acid to the latex until the serum was just clear (serum pH about 6.2). The serum was drained and the polymer given three 130° F. water washes. The liquid polymer was then drained onto trays for drying in the vacuum dryer. Drying was accomplished in about 20 hours in the vacuum oven operating at 170° F. and 22 in. Hg of vacuum. The viscosity of said copolymer was in the order of 600 poises at 77° F.

This liquid copolymer was then used to prepare a propellant composition containing the following ingredients in the amounts shown:

| Ingredient | Wt. Percent | Wt. Percent |
| --- | --- | --- |
| Binder Component |  | 80 |
| Copolymer | 74.1 |  |
| ZP–211 [3] (plasticizer) | 14.8 |  |
| Tri(2-methyl-1-aziridinyl)-phosphine oxide | 5.0 |  |
| Monochloroacetic acid | 6.1 |  |
| Oxidizer Component Ammonium Perchlorate |  | 20 |

[3] Di-(1,4,7-trioxaundecyl) methane.

In preparing said propellant the ammonium perchlorate (particle size in the range of 18 to 200 microns) was mixed with said copolymer for 20 minutes at 160° F. under vacuum in a Read Company standard sigma blade mixer. A mixture of the monochloracetic acid, the tri(2-methyl-1-aziridinyl)-phosphine oxide, and the ZP-211, prepared by adding said phosphine oxide to said acid slowly and keeping the temperature below 180° F., and then adding the ZP-211, was then added to the copolymer mixture in said mixer and mixing was continued for an additional 10 minutes under vacuum at 160° F. The final mixture was then poured into a mold and cured for 48 hours at 160° F. After curing, physical properties were determined on test specimens of the cured propellant. Results of these tests are given in Table I below.

EXAMPLE V

A propellant material was prepared and cured as in Example I, except that the following proportions of ingredients were used in the binder component:

| | Weight percent |
|---|---|
| VP-15 | 75.7 |
| ZP-211 | 15.2 |
| Tripropylenephosphoramide | 4.1 |
| Monochloroacetic acid | 5.0 |

The propellant composition was cured for 48 hours at 160° F. The physical properties are given in Table I below.

EXAMPLE VI

A propellant material, was prepared and cured as in Example I, except that the curing agent used was paradichloroxylene. The following proportions of binder ingredients were used. As before, 80 parts by weight of ammonium perchlorate and 20 parts of binder were employed. Physical properties are given in Table I below.

| | Weight percent |
|---|---|
| VP-115 (A-3295) | 79.5 |
| ZP-211 | 15.7 |
| Paradichloroxylene | 4.8 |

*Table I*
PHYSICAL TESTS ON PROPELLANT COMPOSITIONS

| | Test Temp., F. | Maximum Tensile, p.s.i. | Tensile at Break, p.s.i. | Percent Elongation at Maximum Tensile | Percent Elongation at Break | Modulus |
|---|---|---|---|---|---|---|
| Example IV | 70 | 151 | 146 | 16.2 | 17.8 | 1,350 |
| | 170 | 71 | ------ | 14.3 | ------ | 650 |
| | -40 | 526 | 507 | 6.4 | 7.9 | 17,700 |
| | -70 | 802 | 751 | 3.6 | 5.7 | 45,000 |
| Example V | 70 | 113 | 109 | 16.0 | 17.3 | 914 |
| | 170 | 68 | ------ | 15.9 | ------ | 517 |
| | -40 | 426 | 391 | 7.4 | 9.2 | 11,975 |
| | -70 | 714 | 658 | 4.8 | 6.6 | 31,000 |
| Example VI | 70 | 73 | 70 | 16.8 | 18.0 | 657 |
| | 170 | 51 | 50 | 14.1 | 16.2 | 484 |
| | -40 | 254 | 237 | 7.7 | 10.0 | 8,520 |
| | -70 | 660 | 558 | 4.3 | 6.9 | 31,000 |

EXAMPLE VII

A liquid copolymer was prepared by emulsion polymerization of 1,3-butadiene and 2-methyl-5-vinylpyridine at 122° F. The polymerization recipe was as follows:

| | Parts by weight |
|---|---|
| Water | 200 |
| 1,3-butadiene | 85 |
| 2-methyl-5-vinylpyridine | 15 |
| Potassium fatty acid soap | 5.0 |
| Potassium persulfate | 0.40 |
| Sulfate mercaptan | 5.0 |
| Shortstop: di-t-butylhydroquinone | 0.20 |

The reaction time was approximately 12 hours to a 60 percent conversion. The copolymer was recovered in the same manner as described above in Example IV. Said copolymer had a viscosity of 440 poises at 770° F.

The liquid copolymer was then used to prepare a propellant composition as described in Example IV above with the exception that the binder component contained the following ingredients

| | Weight percent |
|---|---|
| Copolymer | 82.0 |
| ZP-211 | 8.2 |
| Tri(2-methyl-1-aziridinyl)-phosphine oxide | 4.4 |
| Monochloroacetic acid | 5.4 |

The final propellant composition mixture was then poured into a mold and cured for 48 hours at 160° F. as described above in Example IV. After curing, physical properties were determined on test specimens of the cured propellant. The results of these tests are given in Table II below:

*Table II*

| Test Temperature, ° F | 70 | 170 | -40 | -70 |
|---|---|---|---|---|
| Maximum Tensile, p.s.i. | 82 | 53 | 269 | 542 |
| Tensile at Break, p.s.i. | 79 | 50 | 212 | 390 |
| Elongation at Maximum Tensile, percent | 30 | 28 | 12.5 | 9.6 |
| Elongation at Break, percent | 33 | 29 | 21 | 19 |
| Modulus | 400 | 261 | 4,473 | 11,100 |

Strands approximately 7 inches long were cut from said last mentioned cured propellant and all the surfaces of said strands, except one end, were restricted to prevent burning except on said end. The strand sections were then mounted in a bomb to determine the burning rate. The bomb was pressured to the desired pressure with nitrogen. The strands were ignited and the time required for the propellant to burn between two fusible wires spaced 5 inches apart was recorded. By determining the strand burning rate at different temperatures over a given range, and at a given constant pressure, the temperature sensitivity of the burning rate can be computed from the equation $$\pi p = \frac{\left(\ln \frac{r_1}{r_2}\right) 100}{T_1 - T_2}$$

wherein $r_1$ and $r_2$ are the burning rates at temperatures $T_1$ and $T_2$, respectively. Said temperatures are expressed in degrees Fahrenheit and $T_1$ is greater than $T_2$. Thus, the units for $\pi p$ are in percent per degree Fahrenheit. The results of said burning rate tests are given in Table III below:

*Table III*
BURNING RATE DATA

| Temperature, ° F | 70 | 170 |
|---|---|---|
| Rate at 600 p.s.i. in./sec | 0.231 | ------ |
| Rate at 1,000 p.s.i. in./sec | 0.260 | 0.300 |
| $n^*$ | 0.23 | ------ |
| $\pi p$ | 0.142 | ------ |

*$n$ is the burning rate exponent.

While certain examples have been set forth above for purposes of illustration, the invention is not limited thereto. Various other modifications of the invention will be aparent to those skilled in the art in view of this disclosure. Such modifications are within the spirit and scope of the invention.

I claim:

1. A composition of matter consisting essentially of: a halocarboxylic acid containing from 2 to 10 carbon atoms per molecule and a single halogen atom selected from the group consisting of chlorine, bromine and iodine; and from about 0.3 to about 0.4 mol per mol of said acid of a tri(aziridinyl)phosphine compound selected from the group consisting of oxides and sulfides having the formula

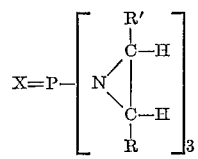

wherein: X is selected from the group consisting of oxygen and sulfur; each R' is selected from the group consisting of a hydrogen atom and a methyl radical; and each R is selected from the group consisting of a hydrogen atom, and alkyl radicals containing from 1 to 18 carbon atoms.

2. A curing agent suitable for curing a liquid copolymer of (a) a conjugated diene containing 4 to 10 carbon atoms per molecule with (b) a

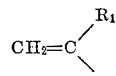

substituted pyridine compound selected from the group consisting of pyridine and alkyl substituted pyridine wherein the total number of carbon atoms in the nuclear alkyl substituents is not more than 15 and wherein $R_1$ is selected from the group consisting of a hydrogen atom and a methyl radical, and (c) another polymerizable monomer selected from the group consisting of styrene, lower alkyl and alkoxy substituted styrenes, acrylonitrile, methacrylonitrile, and lower alkyl acrylates and methacrylates, in which the monomer mixture from which said copolymer is prepared can contain, in parts by weight per 100 parts of total monomers, from 50 to about 5 parts of said pyridine compound, from 50 to about 95 parts of said conjugated diene, and from 0 to about 48 parts of said other polymerizable monomer, said curing agent consisting essentially of: a halocarboxylic acid containing from 2 to 10 carbon atoms per molecule and a single halogen atom selected from the group consisting of chlorine, bromine and iodine; and from about 0.3 to about 0.4 mol per mol of said acid of a tri-aziridinyl)phosphine compound selected from the group consisting of oxides and sulfides having the formula

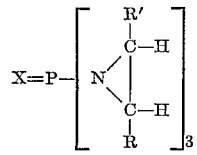

wherein: X is selected from the group consisting of oxygen and sulfur; each R' is selected from the group consisting of a hydrogen atom and a methyl radical; and each R is selected from the group consisting of a hydrogen atom, and alkyl radicals containing from 1 to 18 carbon atoms.

3. A composition of matter according to claim 1 wherein said halocarboxylic acid is monochloroacetic acid.

4. A composition of matter according to claim 1 wherin said phosphine compound is tri(2-methyl-1-aziridinyl)phosphine oxide.

5. A composition of matter according to claim 1 wherein said halocarboxylic acid is monochloroacetic acid, and said phosphine compound is tri(2-methyl - 1-aziridinyl)phosphine oxide.

6. A composition of matter according to claim 2 wherein said halocarboxylic acid is monochloroacetic acid, and said phosphine compound is tri(2-methyl-1-aziridinyl)phosphine oxide.

7. A composition of matter consisting essentially of: a halocarboxylic acid characterized by the formula

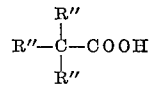

wherein each R'' is selected from the group consisting of chlorine, bromine, iodine, hydrogen, and alkyl groups containing from 1 to 4 carbon atoms, and only one of said R'' substituents is halogen; and from about 0.3 to about 0.4 mol per mol of said acid of a tri(aziridinyl)-phosphine compound selected from the group consisting of oxides and sulfides having the formula

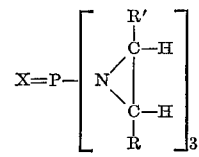

wherein: X is selected from the group consisting of oxygen and sulfur; each R' is selected from the group consisting of a hydrogen atom and a methyl radical; and each R is selected from the group consisting of a hydrogen atom, and alkyl radicals containing from 1 to 18 carbon atoms.

8. A composition of matter according to claim 7 wherein said halocarboxylic acid is monochloroacetic acid.

9. A composition of matter according to claim 7 wherein said phosphine compound is tri(2-methyl-1-aziridinyl)phosphine oxide.

10. A composition of matter according to claim 7 wherein said halocarboxylic acid is monochloroacetic acid, and said phosphine compound is tri(2-methyl-1-aziridinyl)phosphine oxide.

No references cited.

JULIUS GREENWALD, *Primary Examiner.*

BENJAMIN R. PADGETT, REUBEN EPSTEIN,
*Examiners.*